US006268577B1

(12) United States Patent
Marquardt et al.

(10) Patent No.: US 6,268,577 B1
(45) Date of Patent: Jul. 31, 2001

(54) PUSH-PULL SWITCH OPERATOR

(75) Inventors: Terry L. Marquardt, St. Charles, IL (US); Rudolf E. Zimmermann, Sulzbach-Rosenberg (DE)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/465,049

(22) Filed: Dec. 16, 1999

(51) Int. Cl.[7] ............................ H01H 3/02; H01H 15/24; G01G 1/00

(52) U.S. Cl. .............................. 200/330; 74/503; 74/504; 200/529; 200/538

(58) Field of Search ..................................... 200/520–574, 200/329–345, 4, 16 A; 74/503, 504

(56) References Cited

U.S. PATENT DOCUMENTS 2,800,806 * 7/1957 Sangster ................................. 74/503
3,581,036 * 5/1971 Dennison ............................. 200/330
4,255,633 * 3/1981 Johnston et al. ...................... 200/534
4,282,414 * 8/1981 Johnston et al. ...................... 200/519
4,902,865 * 2/1990 Muller et al. ......................... 200/538
5,408,061 * 4/1995 Martin .................................. 200/538
5,605,225 * 2/1997 Schaeffer ............................. 200/539
5,684,670 * 11/1997 Zimmermann et al. ......... 200/296 X

FOREIGN PATENT DOCUMENTS

647954 * 4/1995 (EP) .

* cited by examiner

*Primary Examiner*—J. R. Scott

(57) ABSTRACT

A push-pull switch operator includes a housing. A rotary drive is rotationally mounted in the housing and has a circumferential cam track. An actuator is operatively coupled to the rotary drive for converting linear movement of the actuator to rotary movement of the rotary drive. A pusher is received in the housing and has a follower pin riding in the cam track to convert rotary movement of the cylinder to linear movement of the pusher. The pusher actuates an electrical switch. A cap is operatively coupled to the actuator for manually operating the actuator between in, middle and out positions to selectively operate the pusher.

19 Claims, 6 Drawing Sheets

PUSH-PULL SWITCH OPERATOR

FIELD OF THE INVENTION

This invention relates to electromechanical switches and, more particularly, to a push-pull switch operator.

BACKGROUND OF THE INVENTION

A push-pull switch is commonly used as a manually operated controller for industrial electric motor control circuits. A push-pull switch is typically mounted in a front panel of a control enclosure. Push-pull switches are used in applications where push and pull actuation of the control circuit is desired, as opposed to single push button, rotary selector switch or knife switches, for example. A push-pull switch has a cap that actuates an electrical switch to open and close electrical circuits.

Prior push-pull switches used spring-loaded ball bearings to pop into side grooves. The cap was directly linked to a pushing part that actuated the electrical contact blocks. The ball bearings detented into side grooves, locating the position of the linkage to an in position, a middle position, or an out position.

Because of the direct linkage used in prior push-pull switches, switch contacts could move only about half of the distance normally travelled by a conventional push-button operator in moving from middle to in-positions, or middle to out-positions. This reduced the open air gap in the contact blocks, forcing a reduction in ampere rating for a standard contact block or the use of special early-make or late-break contact blocks. The use of a direct linkage also required that all contact blocks used with the push-pull switch operate simultaneously. This reduced the application options for individual push-pull switches. Also, spring-loaded ball bearings can be difficult to assemble.

The present invention is intended to overcome the problems discussed above, in a novel and simple manner.

SUMMARY OF THE INVENTION

In accordance with the invention a push-pull switch uses indirect contact actuation.

In accordance with one aspect of the invention there is disclosed a push-pull switch operator including a housing. A rotary drive is rotationally mounted in the housing and has a circumferential cam track. An actuator is operatively coupled to the rotary drive for converting linear movement of the actuator to rotary movement of the rotary drive. A pusher is received in the housing and has a follower pin riding in the cam track to convert rotary movement of the cylinder to linear movement of the pusher. The pusher actuates an electrical switch, in use. A cap is operatively coupled to the actuator for manually operating the actuator between in, middle and out positions to selectively operate the pusher.

It is a feature of the invention that the rotary drive comprises a two-piece assembly having a driver operatively coupled to the actuator whereby linear movement of the actuator is converted to rotary movement of the driver and a cam operatively coupled to the driver for rotation therewith and the cam track pattern is provided on the cam. A torsion spring biases the cam in the housing so that the actuator is normally in the middle position.

It is another feature of the invention that the actuator comprises a cylinder including a helical slot and the rotary drive is telescopically received in the cylinder and has a driver-arm received in the helical slot. The housing has a circumferential slot receiving the driver-arm to constrain linear movement of the rotary drive.

It is a further feature of the invention to provide a second pusher received in the housing and having a follower pin riding in the cam track to convert rotational movement of the cylinder to linear movement of the second pusher. The second pusher actuates a second electrical switch, in use. The cam track is configured to operate the two pushers in opposite directions. The cam track comprises oppositely-oriented helical tracks.

It is another feature of the invention that the driver-arm extends radially outwardly from a flexible arm. A spring in the rotary drive prevents inward deflection of the flexible arm.

It is yet another feature of the invention to provide an apron snap fit to the actuator and surrounding a front end of the housing. A ring gasket surrounds an outer wall at the front end of the housing and contacts the apron for sealing the housing. The ring gasket is formed of rubber and includes a wiper seal.

There is disclosed in accordance with another aspect of the invention a push pull switch operator including a housing. A drive assembly is movably mounted in the housing and has a cam track. A cap is operatively coupled to the drive assembly. The cap is manually, linearly actuable between in, middle and out positions. A pusher is received in the housing and has a follower pin riding in the cam track. The cam track is configured to convert linear movement of the cap in one direction to linear movement of the pusher in an opposite direction. The pusher actuates an electrical switch, in use.

Further features and advantages of the invention will be readily apparent from the specification and from the drawing.

DETAILED DESCRIPTION OF THE INVENTION

Figure 1:
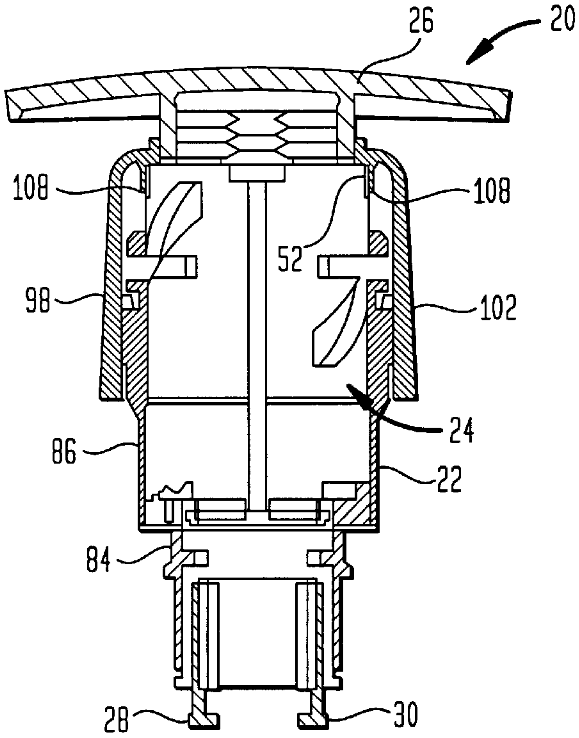
FIG. 1 is a partial sectional view, with parts removed for clarity, of a push-pull switch operator in accordance with the invention in a normal or middle position.

Referring initially to FIG. 1, a push-pull switch operator 20 in accordance with the invention is illustrated. The push-pull switch operator 20 can operate separate contact blocks. In accordance with the invention, the contact blocks can be actuated in a direction opposite of the direction of the pulling actuation of the operator 20, as described more specifically below.

Figure 2:
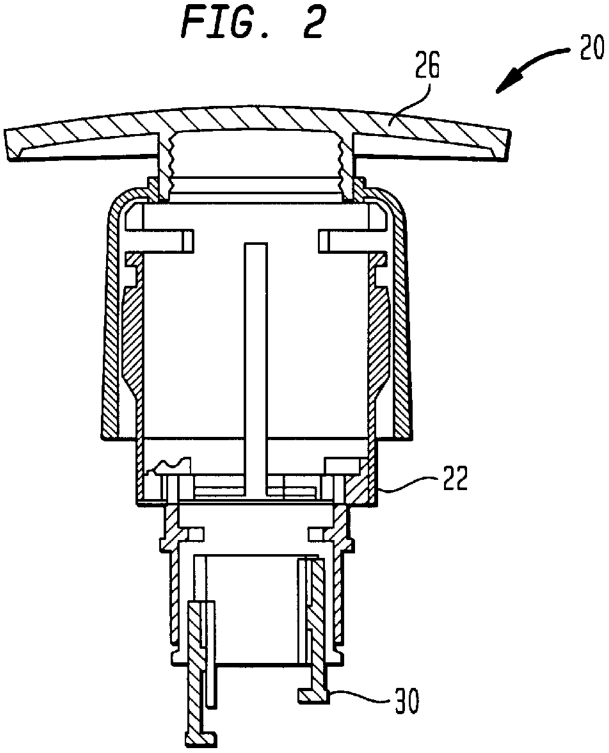
FIG. 2 is a view similar to that of FIG. 1 illustrating the operator pushed to an in-actuated position.

The operator 20 includes a tubular barrel housing 22. The housing 22 includes a barrel 84 and a front ring 86. A drive assembly 24, partially illustrated in FIG. 1, is movably mounted in the housing 22. A mushroom cap 26 is operatively coupled to the drive assembly 24. The cap 26 is manually, linearly actuable from a neutral or middle position, as shown in FIG. 1, and can be pushed to an "in" position illustrated in FIG. 2, and can be pulled to an "out" position shown in FIG. 3. First and second pushers 28 and 30 are received in the housing 22 and are operatively coupled to the drive assembly 24. The drive assembly 24 is configured, as described below, to convert linear movement of the cap 26 in one direction to linear actuation movement of the first pusher 28 in the same direction and linear actuation movement of the second pusher in an opposite direction. The pushers 28 and 30 actuate an electrical switch in separate contact blocks, such as a contact block 32, see FIG. 13, as described below.

Figure 4:
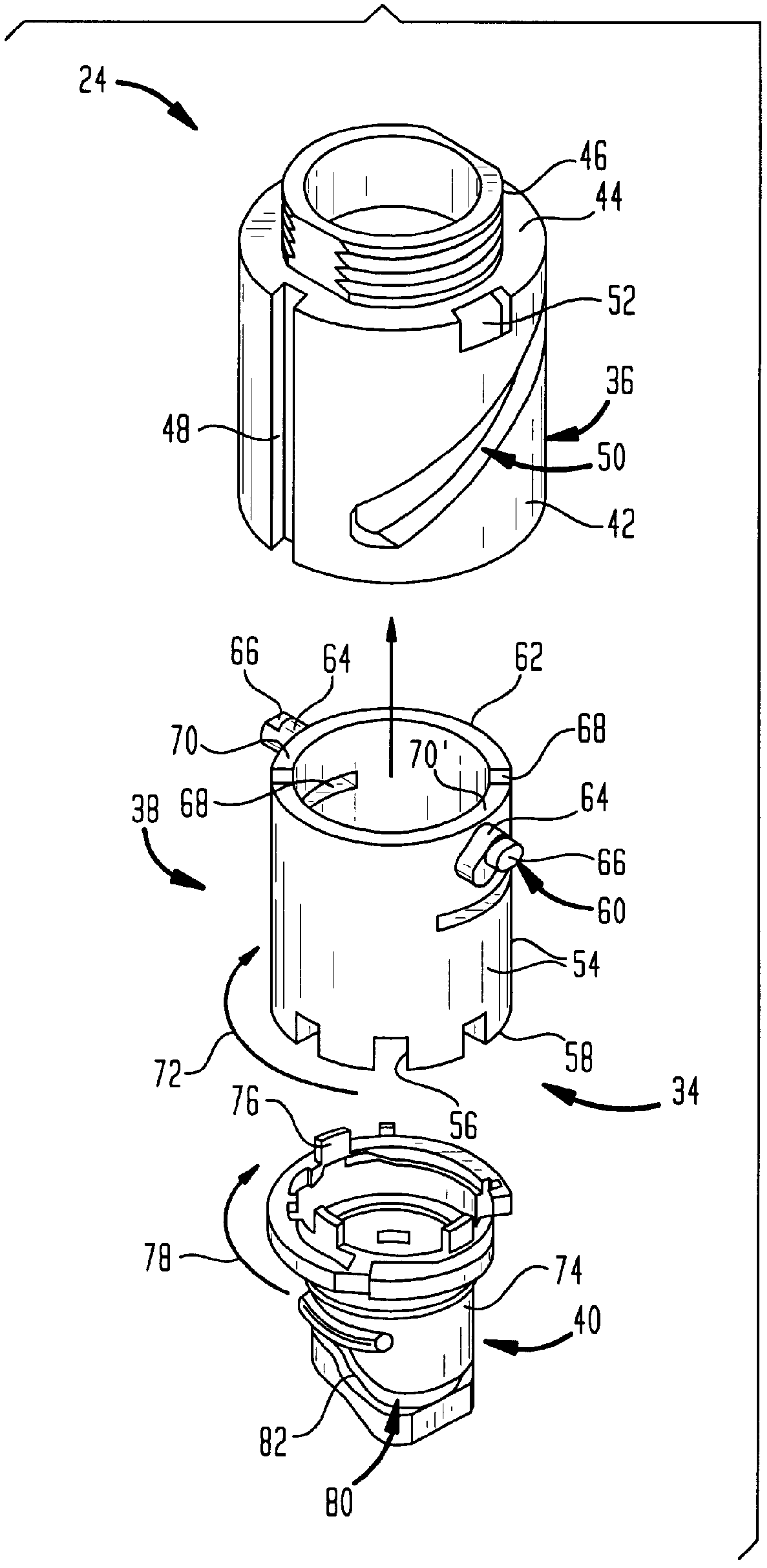
FIG. 4 is an exploded view of a drive assembly for the push-pull operator of FIG. 1.

Referring to FIG. 4, the drive assembly 24 includes a two-piece rotary drive 34 and an actuator 36. The rotary drive 34 includes a driver 38 and a cam 40.

The actuator 36 comprises an outer cylindrical wall 42 having a radially inwardly directed front end shoulder 44 connecting a threaded collar 46. An elongate groove 48, one of which is shown, is provided on each of opposite sides of the cylindrical wall 42. A helical slot 50 is provided on either side of the cylindrical wall 42 disposed between the grooves 48. A pair of openings 52, one of which is shown, are provided at the top of the cylindrical wall 42 proximate the shoulder 44 above each slot 50.

The driver 3 8 comprises a cylindrical wall 54 having plural circumferentially spaced notches 56 at a rear end 58. The cylindrical wall 54 has an outer diameter slightly less than an inner diameter of the actuator cylindrical wall 42 to be telescopically received therein. A pair of opposite driver arms 60 extend radially outwardly from the cylindrical wall 54 proximate a front end 62. Each driver arm 60 includes an oval portion 64 angled corresponding to the angle of the helical slot 50 and an outer projection 66. The cylindrical wall 54 includes an L-shaped slot 68 proximate the front end 62 and surrounding each driver arm 60 to provide a flexible arm 70.

During assembly, as described below, the flexible arms 70 are deflected radially inwardly so that the driver 54 can be inserted in the actuator 36 with the driver arms 60 thereafter being received in the helical slots 50. As such, linear movement of the actuator 36 is converted to rotary movement of the driver 38, as illustrated by an arrow 72.

The cam 40 comprises a generally cylindrical body 74 including frontwardly extending teeth 76. The teeth 76 are receivable in the driver grooves 56 so that the cam 40 is rotational with the driver 38 as illustrated by an arrow 78. The cam 40 has a circumferential cam track 80. The cam track 80 comprises oppositely-directed helical paths 82, one of which is shown, that are used to drive the pushers 28 and 30 in and out.

The assembly of the switch operator 20 is described with reference to FIGS. 5–12.

Figure 3:
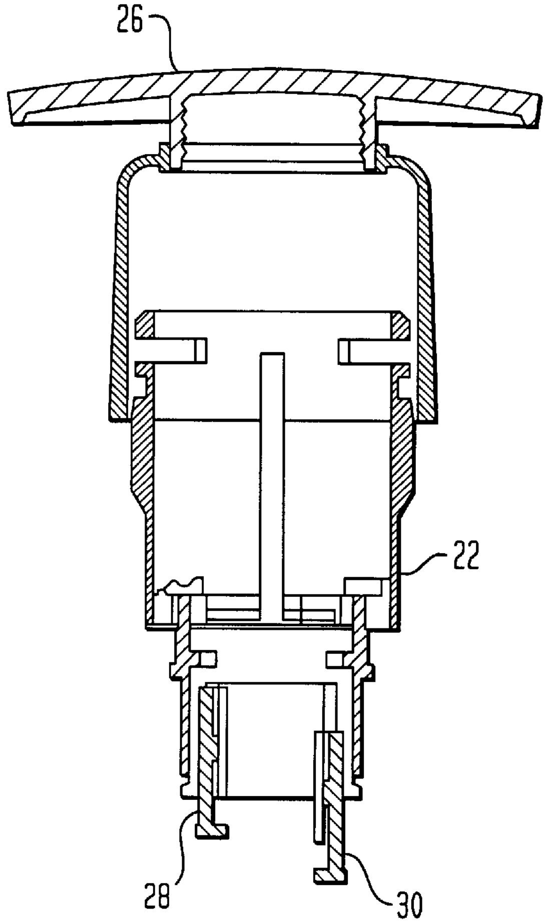
FIG. 3 is a view similar to that of FIG. 1 illustrating the operator pulled to an out-actuated position.
Figure 5:
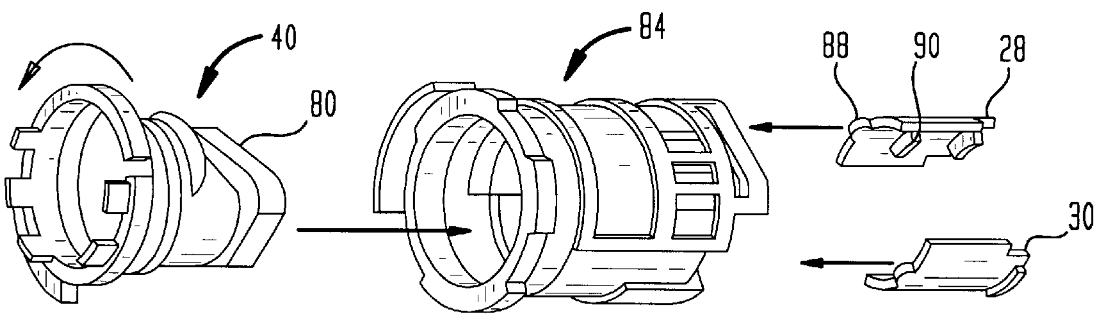
FIGS. 5–12 comprise a series of views illustrating an assembly sequence for the push-pull switch operator of FIG. 1.

Referring initially to FIG. 5, the cam 40 is inserted rearwardly into the barrel 84 as shown. The pushers 28 and 30 are slid into a rear end of the barrel 84. Each pusher 28 and 30 includes a radially-inwardly extending follower pin 88 and a guide pin 90. After inserting the pushers 28 and 30 in the barrel 84, the cam 40 is rotated 90 degrees. As a result, the follower pins 88 are received in and engage the cylindrical cam track 80. The sequence of pusher action is determined by specific pattern of the cam track 80. In the illustrated embodiment of the invention, when the actuator 36 is moved downwardly, the cam 40 rotates in a counter-clockwise direction, viewed downwardly in FIG. 1, so that the first pusher 28 is extended and the second pusher 30 remains in its normal or retracted position, see FIG. 2. When the actuator 36 is pulled outwardly, as shown in FIG. 3, the cam 40 is rotated in a clockwise direction causing the second pusher 30 to extend and the first pusher 28 to remain in the normal or retracted position, as shown in FIG. 3. As is apparent, the cam track 80 could be configured to provide a different sequence of operation of the pushers 28 and 30.

Figure 6:
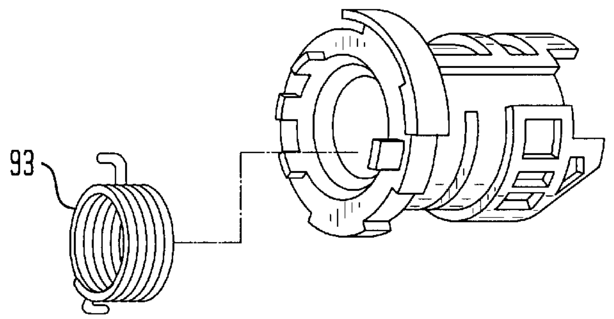

Referring to FIG. 6, a torsion spring 93 is inserted into a front end of the cam 40. The torsion spring 93 is adapted to bias the drive assembly 24 to the neutral or middle position, as shown in FIG. 1.

The general configuration of the barrel 84, cam 40, pushers 28 and 30 and torsion spring 93 is known and has been used in connection with rotary knob-operated selector switches. Such a structure is described generally in European patent No. 0647954 B1, the specification of which is incorporated by reference herein.

Figure 7:
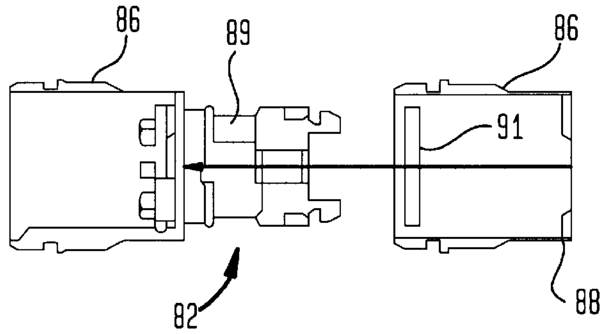

Referring to FIG. 7, the front ring 86 is generally cylindrical and is slid over the barrel 84 in a direction indicated by the arrow 88, to the position illustrated in phantom, to assemble the housing 22. The front ring 86 includes a circumferential slot 91 at either side.

Figure 8:
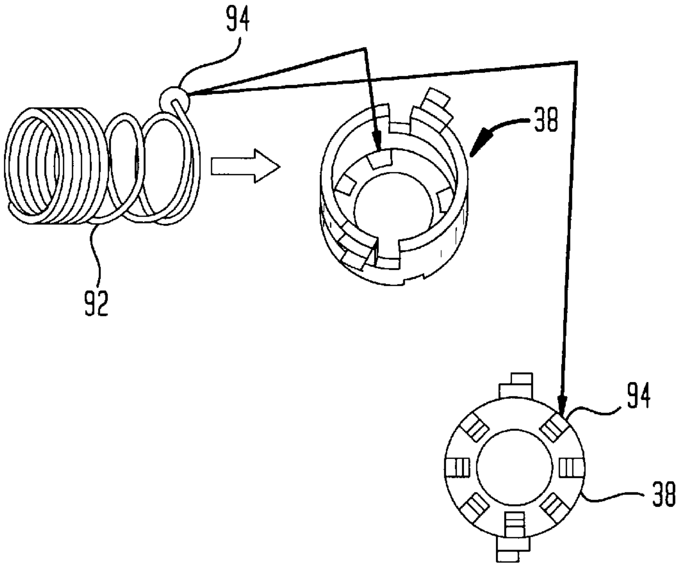
Figure 9:
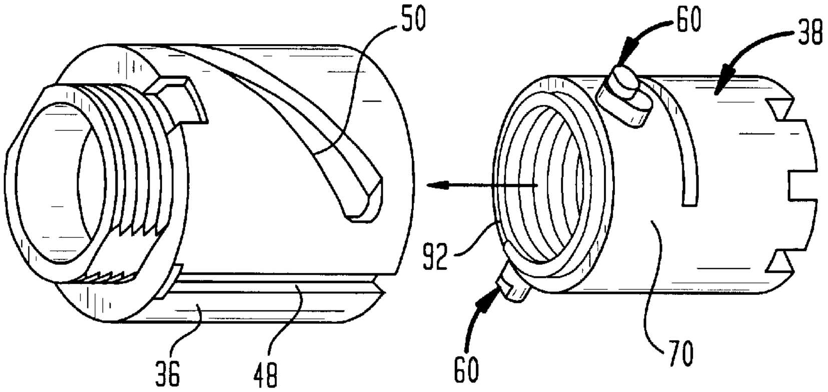

Referring to FIG. 8, a coil spring 92 is inserted in the driver 38 so that an end 94 pokes into the driver 38, as shown in the lower portion of the figure which represents a bottom view of the driver 38. Referring to FIG. 9, an assembly machine is used to squeeze the driver arms 60 inward and the driver 38 is then snapped into the actuator 36 until the driver arms 60 snap into the slot 50 at either side. During this assembly process the coil spring 92 is compressed so that it does not interfere with the flexible arms 70. After insertion the spring 92 is released so that it acts as a spacer to prevent inward deflection of the flexible arms 70 and thus the driver arms 60.

Figure 10:
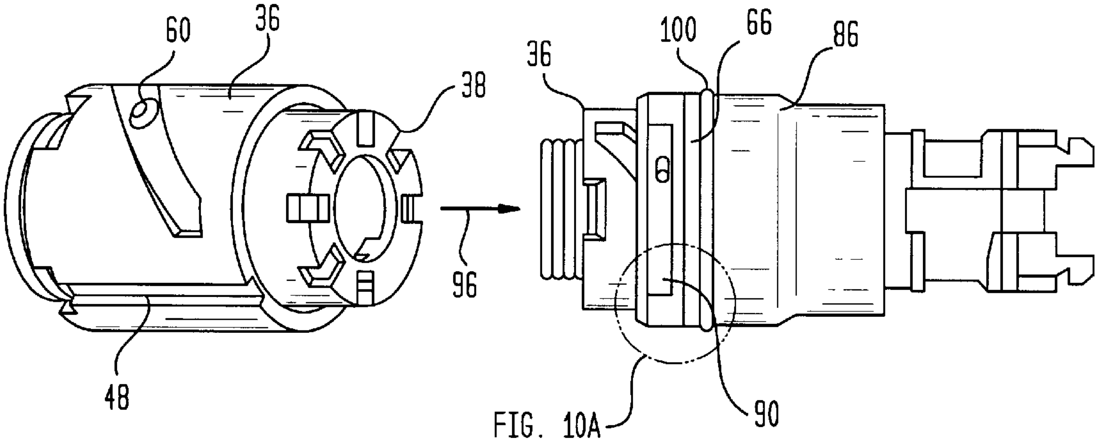
Figure 10A:
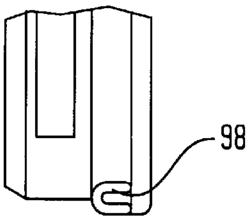
Figure 11:
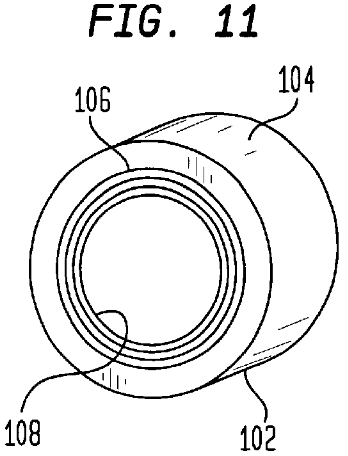
Figure 12:
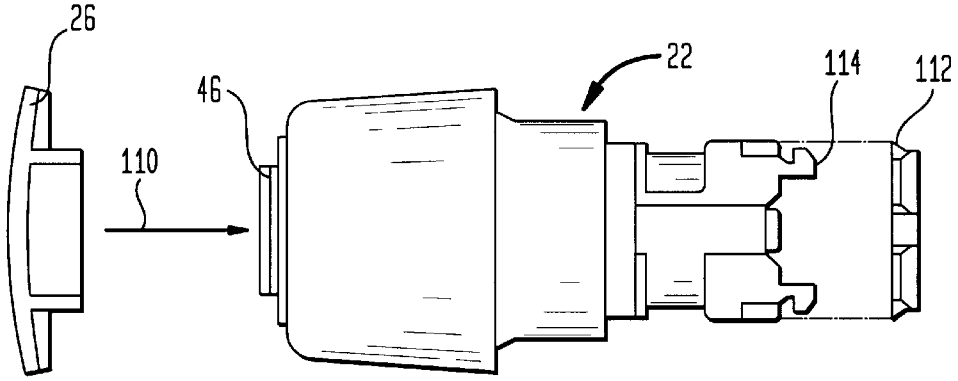

Referring to FIG. 10, the actuator 36, having the driver 38 therein, is placed in an assembly machine which again depresses the driver arm 60 inwardly and the assembly is snapped into the front ring 86, as illustrated by an arrow 96. After this assembly step, the driver arm projections 66 extends outwardly into the front ring slots 90 to constrain linear movement of the driver 38. Rotary movement of the actuator 36 is constrained by tabs (not shown) in the front ring 86 extending into the actuator grooves 48. A ring gasket 98 incorporating a wiper seal is then positioned around the front ring 86 in a groove 100, see also FIG. 10A. Referring to FIG. 11, an apron 102 is illustrated. The apron 102 comprises a generally cylindrical wall 104 having an inwardly directed shoulder 106 supporting a pair of flexible tabs 108, one of which is shown. The tabs 108 are received in the actuator slots 52 to provide a light-snap fit, as shown in FIG. 1. The gasket 98 thus provides a wiper seal between the apron 102 and the front ring 86. Referring to FIG. 12, the mushroom cap 26 is then threaded onto the actuator threaded collar 46, as illustrated by an arrow 110. A panel gasket 112 is then placed around the housing 22 for sealing the housing 22 in an enclosure panel, in use.

Figure 13:
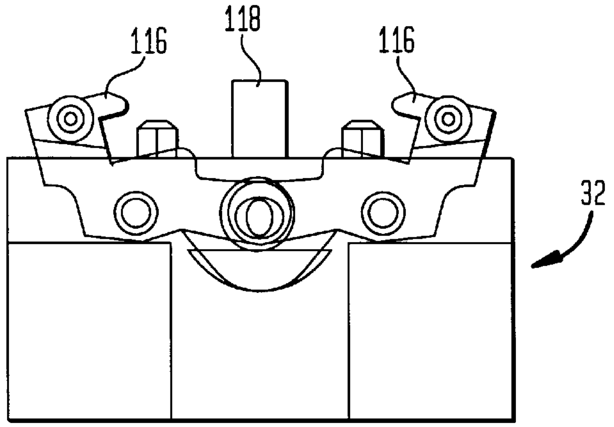
FIG. 13 is a side view of a contact block used with the push-pull switch operator of FIG. 1.

The contact block 32, see FIG. 13, having an internal electrical switch, is mounted on base feet 114 of the housing 22, see FIG. 12, using snap-fit toggle linkages 116, as is known. Actuation of the cap 26, which is coupled to the drive assembly 24, selectively extends the pushers 28 and 30 from the housing 22 depressing a contact block plunger 118 causing the electrical switch to switch electrical states. The housing 22 can support two contact blocks 32 for separate actuation by the pushers 28 and 30.

Thus, in accordance with the invention, linear movement of the cap 26 in one direction can be used to operate pushers 28 and 30 in either the same or in an opposite direction to selectively actuate contact blocks 32. The shape of the helical cam track 80 determines whether left or right side contact blocks 32, or both, are actuated when the cap is pushed in or pulled out. Moreover, the in and out positions can be maintained, or can allow the device to return to the middle position by selective assembly variations of the torsion spring, which is known and does not form part of this invention.

We claim:

1. A push-pull switch operator including:

a housing;

a rotary drive rotationally mounted in the housing and having a circumferential cam track;

an actuator operatively coupled to the rotary drive for converting linear movement of the actuator to rotary movement of the rotary drive;

a pusher received in the housing and having a follower pin riding in the cam track to convert rotational movement of the cylinder to linear movement of the pusher, the pusher for actuating an electrical switch; and a cap operatively coupled to the actuator for manually operating the actuator between in, middle and out positions to selectively operate the pusher.

2. The push-pull switch operator of claim I wherein the rotary drive comprises a two-piece assembly having a driver operatively coupled to the actuator whereby linear movement of the actuator is converted to rotary movement of the driver and a cam operatively coupled the driver for rotation therewith and the cam track pattern is provided on the cam.

3. The push-pull switch operator of claim 2 further comprising a torsion spring biasing the cam in the housing so that the actuator is normally in the middle position.

4. The push-pull switch operator of claim 1 wherein the actuator comprises a cylinder including a helical slot and the rotary drive is telescopically received in the cylinder and has a driver arm received in the helical slot.

5. The push-pull switch operator of claim 4 wherein the housing has a circumferential slot receiving the driver arm to constrain linear movement of the rotary drive.

6. The push-pull switch operator of claim 1 further comprising a second pusher received in the housing and having a follower pin riding in the cam track to convert rotational movement of the cylinder to linear movement of the second pusher, the second pusher for actuating a second electrical switch.

7. The push-pull switch operator of claim 6 wherein the cam track is configured to operate the two pushers in opposite directions.

8. The push-pull switch operator of claim 7 wherein the cam track comprises oppositely oriented helical tracks.

9. The push-pull switch operator of claim 4 wherein the driver arm extends radially outwardly from a flexible arm.

10. The push-pull switch operator of claim 9 further comprising a spring in the rotary drive for preventing inward deflection of the flexible arm.

11. The push-pull switch operator of claim 1 further comprising an apron snap fit to the actuator and surrounding a front end of the housing.

12. The push-pull switch operator of claim 9 further comprising a ring gasket surrounding an outer wall at the front end of the housing in contact with the apron for sealing the housing.

13. The push-pull switch operator of claim 12 wherein the ring gasket is formed of rubber.

14. The push-pull switch operator of claim 12 wherein the ring gasket includes a wiper seal.

15. A push-pull switch operator including:

a housing;

a drive assembly movably mounted in the housing and having a cam track;

a cap operatively coupled to the drive assembly, the cap being manually, linearly actuable between in, middle and out positions; and a pusher received in the housing and having a follower pin riding in the cam track, the cam track being configured to convert linear movement of the cap in one direction to linear movement of the pusher in an opposite direction, the pusher for actuating an electrical switch.

16. The push-pull switch operator of claim 15 wherein the drive assembly comprises an actuator, a driver operatively coupled to the actuator whereby linear movement of the actuator is converted to rotary movement of the driver and a cam operatively coupled the driver for rotation therewith and the cam track pattern is provided on the cam.

17. The push-pull switch operator of claim 16 wherein the actuator comprises a cylinder including a helical slot and the rotary drive is telescopically received in the cylinder and has a driver arm received in the helical slot.

18. The push-pull switch operator of claim 15 further comprising a second pusher received in the housing and having a follower pin riding in the cam track, the cam track being configured to convert linear movement of the cap in the one direction to linear movement of the second pusher in the one direction, the second pusher for actuating a second electrical switch.

19. The push-pull switch operator of claim 18 wherein the cam track comprises oppositely oriented helical tracks.

* * * * *